COOLING SYSTEM FOR COMMUNICATION CHASSIS

Filed Aug. 26, 1957

INVENTORS.
LUTHER E. MOORE.
LAURANCE D. SHAW.

BY Lockwood, Galt, Woodard & Smith.
ATTORNEYS.

2,972,940
Patented Feb. 28, 1961

2,972,940

COOLING SYSTEM FOR COMMUNICATION CHASSIS

Luther E. Moore and Laurance D. Shaw, Fort Wayne, Ind., assignors to The Magnavox Company, Fort Wayne, Ind., a corporation Filed Aug. 26, 1957, Ser. No. 680,333

4 Claims. (Cl. 98—42)

This invention relates generally to air cooling systems for electrical apparatus and more particularly it relates to an air cooling system for airborne communications apparatus.

Aircraft are now being developed and possibly already have been developed which fly at such extremely high speeds that air friction on the various surfaces of the aircraft creates intense heat within the aircraft. Temperatures of several hundred degrees Fahrenheit occur within the aircraft, whereby air cooling equipment is provided for cooling the areas occupied by members of the crew. Due to power supply and weight limitations, minimum cooling is provided and the normal temperature within the area occupied by the crew can be in excess of 100° F. Since conventional communications apparatus generates heat and since such apparatus is usually housed in confined space with various types of shielding around certain components, it is found that communications apparatus must be cooled in order to maintain it at a safe operating temperature. Because of the weight and power limitations inherent in aircraft, it is extremely difficult, if not impossible, to provide special cooling apparatus for the sole purpose of cooling the communications equipment and other types of electronic equipment.

The principal object of this invention is to provide a cooling system adapted to cooperate with the cooling system of an aircraft for cooling electronic apparatus, such as that utilized in high-speed aircraft.

Another object of this invention is to provide a cooling system for electronic apparatus of the type used in high-speed aircraft and which does not require a separate and independent source of cool air other than that utilized for cooling the aircraft.

A further object of this invention is to provide a cooling system for electronic apparatus which is adapted to produce maximum cooling with a minimum quantity of air.

A still further object of this invention is to provide a cooling system for electronic apparatus adapted to produce maximum turbulence of the cooling air in contact with a hot body thereby to obtain high efficiency of heat transfer to the cooling air with a minimum pressure drop through the system.

In accordance with this invention, there is provided cooling apparatus for airborne electronic equipment which comprises a duct system cooperating with the cooling system of an aircraft for supplying a flow of air in intimate contact with the various components of the electronic apparatus which generates heat.

Further in accordance with this invention, there is provided cooling apparatus for electronic apparatus comprising a duct system having components cooperating with hot bodies in said electronic apparatus in such a manner as to obtain maximum turbulence of air with a minimum drop in pressure.

The full nature of the invention will be understood from the accompanying drawings and the following description and claims:

Figures 1, 2, 3, 4, 5:
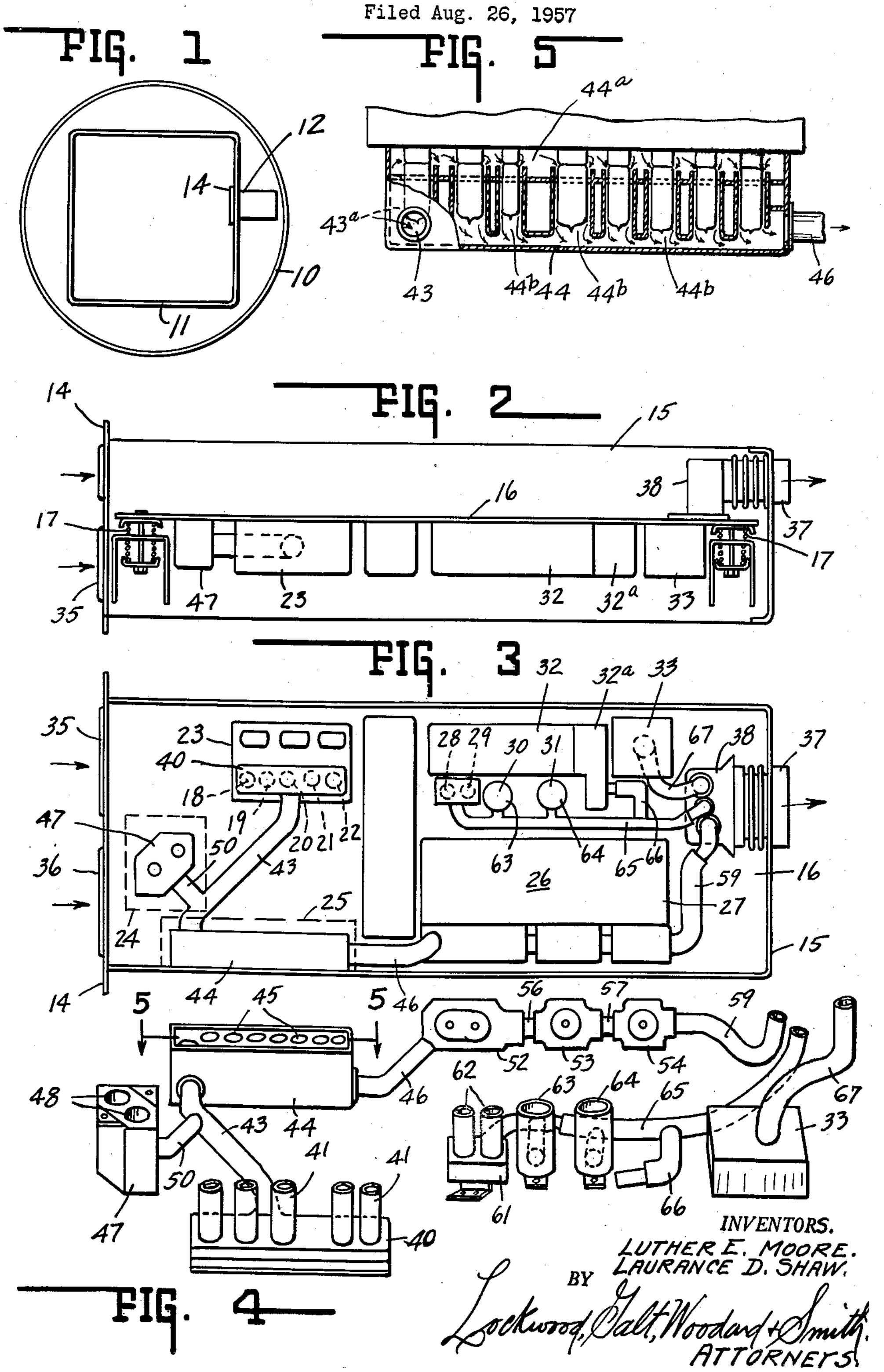
Fig. 1 is a schematic diagram illustrating in a general way the cross section of an aircraft fuselage with electronic apparatus mounted therein.
Fig. 2 is a side elevation of a unit of electronic equipment incorporating the cooling system of this invention.
Fig. 3 is a bottom plan view of the apparatus shown in Fig. 2.
Fig. 4 is a perspective view illustrating diagrammatically the cooling apparatus before it is installed in the electronic equipment shown in Figs. 2 and 3.
Fig. 5 is a cross section taken on line 5—5 of Fig. 4.

Referring to Fig. 1 of the drawings, it is conventional in aircraft having pressurized crew space to provide a fuselage having an outer shell 10 and an inner shell 11. The inner shell 11 may be sealed from the atmosphere and air may be supplied thereto under pressure in order to maintain a pressure commensurate with that at medium altitudes so that the crew working within the inner shell 11 may have an adequate supply of oxygen and will not be subjected to the effects of the relatively low atmospheric pressure occurring at high altitudes. In order to maintain livable temperatures in high-speed aircraft, the air supplied to the chamber within the inner shell 11 is cooled to a temperature of the order of 100° F. and a constant flow is maintained by discharging air from within the shell 11 into the space between the outer shell 10 and the inner shell 11 and into the outside atmosphere.

In order to utilize the pressure differential between shells 10 and 11 and make maximum use of the space within the outer shell 10, the electronic equipment, such as that shown in Figs. 2 and 3, may be mounted in the space between shells 10 and 11 as shown at 12 in Fig. 1. The front end panel 14 of the electronic equipment may be mounted just within the inner shell 11 and in this manner the meters and control knobs of the electronic equipment are accessible from within the inner shell 11.

The electronic equipment may be mounted within a sealed box 15 and on a supporting plate 16, for example, which may be suspended on shock mounts 17 between the top and bottom of the box 15.

Insofar as this invention is concerned, the particular type of electronic apparatus is of no importance because almost all electronic apparatus includes electron tubes, inductances, transformers, or other elements which generate heat. For example, the electronic apparatus illustrated in the drawings may include a number of closely grouped vacuum tubes 18, 19, 20, 21 and 22 mounted on a special chassis 23. A smaller group of two tubes may be mounted on another chassis 24, while another group of tubes may be mounted on still another chassis 25. A group of tubes may be mounted on and form a part of another chassis 26 covered or shielded by means of a cover member 27. A further arrangement may consist of a pair of relatively small tubes 28 and 29 and a pair of relatively large tubes 30 and 31, all being mounted on plate 16 but in different space relationships to one another. Other groups of tubes or inductances, for example, may be mounted on chassis at 32 and 33.

In order to provide a flow of relatively cool air into the sealed box 15, the front end panel 14 may be provided with air inlet ports 35 and 36. Since these ports open into the pressurized crew space within shell 11, relatively cool air from the crew space may flow into box 15. In order to provide exhaust from box 15, an exhaust port 37 may be formed in the rear wall of box 15 and this port may be connected to the space beneath plate 16 by means of an exhaust duct 38. Since the rear end of box 15 is situated between the outer shell 10 and the inner shell 11 of the aircraft, and since this space is normally at atmospheric pressure, there will be a substantial differential in pressure existing between inlet ports 35 and 36 and the outlet port 37.

In order that the vacuum tubes and other heat-generating components of the electronic equipment may be cooled by the air from the crew space of the aircraft, the tubes 18, 19, 20, 21, and 22 may be provided with a manifold 40 on which may be mounted a plurality of cylindrical ducts 41. The ducts 41 may be placed over each of the tubes 18—22 to extend downwardly almost to the bases of these tubes. The manifold 40 may have connected thereto a relatively flexible duct 43 which may in turn, be connected to a box 44, the bottom side of which may be provided with a plurality of apertures 45. Box 44 may be superimposed over the tubes mounted on chassis 25. Duct 43 is connected at one end of box 44, as shown in Figs. 4 and 5, and an outlet duct 46 may be connected to the opposite end of box 44. Duct 43 opens into a closed chamber 43*a* which houses a vacuum tube and this chamber opens into a header portion 44*a*. Thus a manifold is formed over opening 45 so that air may flow out of chamber 43*a* into each of the chambers 44*b* in parallel.

With the apparatus described up to this point, air may flow into the open ends of the cylindrical ducts 41, through manifold 40, duct 43, box 44, through chamber 43*a*, header 44*a*, chambers 44*b*, and duct 46, it being assumed that the duct system eventually will lead to the exhaust duct 38. This is because of the difference in pressure existing between the interior of box 15 and the atmospheric pressure existing outside of the exhaust port 37.

In order to cool the tubes mounted on chassis 24, there may be provided a manifold 47, the bottom of which may be provided with apertures 48, whereby the manifold 47 may be superimposed over the tubes and sealed to chassis 24 so that cooling air may flow over the resistors or other elements under the chassis to cool them and then enter the manifold around the bases of the tubes and flow over the glass envelopes. Manifold 47 may be connected to duct 43 by means of a duct 50.

The tubes mounted on chassis 26 may be cooled by feeding air from duct 46 through the non-conductive housings 52, 53 and 54 which are connected to one another by means of ducts 56 and 57. Housing 54 may then be connected by means of the duct 59 to the exhaust duct 38. Housings 52, 53 and 54 have suitable chambers where air can flow around the tubes.

In order to cool the tubes 28, 29, 30 and 31, a second duct system may be employed which consists of a manifold 61 having cylinders 62 which fit over tubes 28 and 29. For tubes 30 and 31 there may be provided a pair of separate cylinders 63 and 64. The duct 65 may be connected to manifold 61 and cylinders 63 and 64 and may open into the main exhaust duct 38. A chassis 32 may include a member 32*a* sealed thereto and having a connection 66 with duct 65. Another insulating box 33 may be mounted over another circuit component and connected directly to exhaust duct 38 by means of duct 67. As in the case of cylinders 41, for example, the box 33 may be secured to a chassis over the element to be cooled and sealed to the chassis, thereby permitting flow of air over the element to be cooled.

It will be noted that the manifold 40 and its cylinders 41 provide what may be called parallel flow of air with respect to the vacuum tubes 18 to 22, wherein relatively cool air enters directly around the envelopes of each vacuum tube. Cylinders 41 are dimensioned to fit relatively closely with respect to the envelopes of each vacuum tube. This causes air flowing through cylinders 41 to have maximum turbulence in contact with the hot tube envelopes thereby to obtain high efficiency of heat transfer. Where the electronic apparatus includes tuned cavities the cylinders 41 may be formed of non-conducting material whereby cooling ducts are provided which do not change the electrical capacity of a tuned cavity. The box 44 provides more or less parallel flow of air from duct 43 through the box 44 and around the envelopes of each tube. In addition, there may be further flow of air around the base of each tube. Whether a series or parallel flow of air is provided may be determined by the amount of heat which is necessary to extract from each vacuum tube. It should be noted that there is parallel flow of air over the tubes and series flow of air from unit 40, for example, through unit 44 and units 52, 53 and 54. This provides maximum transfer of heat and minimum pressure drop and also a minimum quantity of air. An inherent advantage in this system is that the tubes individually operate at temperatures substantially below the maximum exhaust temperature whereby the life of each tube is substantially increased.

While the invention has been disclosed and described in some detail in the drawings and foregoing dscription, they are to be considered as illustrative and not restrictive in character, as other modifications may readily suggest themselves to persons skilled in this art and within the broad scope of the invention, reference being had to the appended claims.

The invention claimed is:

1. In combination w.th an aircraft having a pressurized crew space and a non-pressurized space within the outer shell of the fuselage, a cooling system for electronic equipment comprising a container mounted with one end exposed to said pressurized crew space and the other end exposed to said non-pressurized space, an inlet port in said one end of said container for pressurizing the interior thereof, an outlet port in the said other end of said container, electronic apparatus supported within said container and including heat-generating dev:ces, duct members superimposed on said heat-generating devices with one end of each duct member open to the interior of said container, manifolds connected to groups of said duct members, and ducts connected between said manifolds and said outlet ports, whereby cooling air flows from the interior of said container through said duct members and ducts to said outlet port.

2. In combination with an aircraft having a pressurized crew space and a non-pressurized space within the outer shell of the fuselage, a cooling system for electronic equipment comprising a container mounted with one wall exposed to said pressurized crew space and another wall exposed to said non-pressur:zed space, an inlet port in said one wall of said container for pressurizing the interior thereof, an outlet port in the said other wall of said container, electronic apparatus supported within said container and including heat-generating devices, duct members superimposed on said heat-generating devices with one end of each duct member open to the interior of said container, and ducts connected between said duct members and said outlet port, whereby cooling air flows from the interior of said container through said duct members and ducts to said outlet port.

3. In combination with an aircraft having a pressurized crew space and a non-pressurized space within the outer shell of the fuselage, a cooling system for electronic equipment comprising a container mounted with one end exposed to said pressurized crew space and the other end exposed to said non-pressurized space, an inlet port in said one end of said container for pressurizing the interior thereof, an outlet port in the said other end of said container, electronic apparatus supported within said container and including heat-generating devices and air-conducting members superimposed on said heat-generating devices with one end of each member open to the interior of said container, and connected to said outlet port, whereby cooling air flows from the interior of said container through said members to said outlet port.

4. In combination with an aircraft having a pressurized crew space and a non-pressurized space within the outer shell of the fuselage, a cooling system for electronic equipment comprising a container, an inlet port in one wall of said container opening into said pressurized crew space for pressurizing the interior of said container, an outlet port in one wall of said container opening into said non-pressurized space, electronic apparatus supported within said container and including heat-generating devices, duct members superimposed on said heat-generating devices with one end of each duct member open to the interior of said container, and ducts connected between said duct members and said outlet port, whereby cooling air flows from the interior of said container through said duct members and ducts to said outlet port.

References Cited in the file of this patent

UNITED STATES PATENTS

| | | |
|---|---|---|
| 2,285,504 | Finch | June 9, 1942 |
| 2,424,683 | Eitel et al. | July 29, 1947 |
| 2,644,315 | Jamieson | July 7, 1953 |
| 2,745,895 | Lideen | May 15, 1956 |
| 2,746,775 | Leonard | May 22, 1956 |
| 2,814,241 | Silver | Nov. 26, 1957 |